(12) United States Patent
Ando

(10) Patent No.: US 12,172,620 B2
(45) Date of Patent: Dec. 24, 2024

(54) BRAKE DEVICE

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 329 days.

(21) Appl. No.: 17/692,266

(22) Filed: Mar. 11, 2022

(65) Prior Publication Data

US 2022/0306061 A1 Sep. 29, 2022

(30) Foreign Application Priority Data

Mar. 26, 2021 (JP) .................................. 2021-053130

(51) Int. Cl.
| | | |
|---|---|---|
| *B60T 8/40* | (2006.01) | |
| *B60T 8/17* | (2006.01) | |
| *B60T 13/58* | (2006.01) | |
| *B60T 13/68* | (2006.01) | |

(52) U.S. Cl.
CPC .......... *B60T 8/4081* (2013.01); *B60T 13/686* (2013.01)

(58) Field of Classification Search
CPC ...... B60T 8/4081; B60T 13/686; B60T 13/16; B60T 13/58; B60T 8/17; B60T 7/042; B60T 11/236
USPC .......................................................... 303/3
See application file for complete search history.

(56) References Cited

U.S. PATENT DOCUMENTS

| | | | |
|---|---|---|---|
| 4,621,498 A | | 11/1986 | Schaefer |
| 4,773,224 A | * | 9/1988 | Sakamoto ............. B60T 11/232 60/585 |
| 5,187,934 A | * | 2/1993 | Mori ....................... B60T 11/20 60/588 |
| 5,328,178 A | * | 7/1994 | Nies ....................... F16J 15/164 277/552 |

(Continued)

FOREIGN PATENT DOCUMENTS

| | | |
|---|---|---|
| JP | 59-96045 A | 6/1984 |
| JP | 2004-301603 A | 10/2001 |
| JP | 2010-13069 A | 1/2010 |

OTHER PUBLICATIONS

Notice of Reasons for Refusal issued in Application No. 2021-053130 dated Jul. 30, 2024, with machine translation.

*Primary Examiner* — Bradley T King
*Assistant Examiner* — James K Hsiao
(74) *Attorney, Agent, or Firm* — TROUTMAN PEPPER HAMILTON SANDERS LLP

(57) ABSTRACT

A brake device to be applied to a vehicle includes a housing, a piston, and a seal member. The housing has a first end that is closed. The housing includes a supply port configured to communicate with a reservoir tank. The piston has an outer peripheral surface, an inner peripheral surface and a through-hole extending from the outer peripheral surface to the inner peripheral surface. The piston is configured to generate a hydraulic pressure in a hydraulic chamber in the housing by moving toward a side of the first end inside the housing. The seal member is provided around the piston in a circumferential direction on the side of the first end with respect to the through-hole. The seal member is configured to seal between an inner peripheral surface of the housing and the outer peripheral surface of the piston.

12 Claims, 5 Drawing Sheets

(56) References Cited

U.S. PATENT DOCUMENTS

| | | | |
|---|---|---|---|
| 5,711,151 A * | 1/1998 | Engfer | B60T 11/236 60/591 |
| 5,897,175 A * | 4/1999 | Terazawa | B60T 8/441 303/155 |
| 5,946,913 A * | 9/1999 | Manzo | B60T 11/236 60/591 |
| 6,183,049 B1 * | 2/2001 | Oka | B60T 13/168 303/114.1 |
| 6,276,136 B1 * | 8/2001 | Oishi | B60T 13/686 303/114.1 |
| 6,276,137 B1 | 8/2001 | Kottmyer et al. | |
| 6,290,306 B1 * | 9/2001 | Friedow | B60T 8/34 303/116.1 |
| 6,430,926 B1 * | 8/2002 | Nakano | B60T 11/20 60/588 |
| 6,848,257 B2 * | 2/2005 | Bacardit | B60T 11/236 60/588 |
| 9,050,949 B2 * | 6/2015 | Miyazaki | B60T 13/166 |
| 9,242,626 B2 * | 1/2016 | Maruo | B60T 8/38 |
| 9,522,663 B2 * | 12/2016 | Ohnishi | B60T 11/20 |
| 10,214,193 B2 * | 2/2019 | Yamaguchi | B60T 13/143 |
| 10,814,855 B1 * | 10/2020 | Ganzel | F16K 33/00 |
| 2001/0032464 A1 | 10/2001 | Inoue et al. | |
| 2002/0050686 A1 * | 5/2002 | Krappmann | F16J 15/3216 277/436 |
| 2003/0024581 A1 * | 2/2003 | Nakamura | F16K 11/0716 137/625.69 |
| 2003/0178262 A1 * | 9/2003 | Pietsch | B60T 11/232 188/151 R |
| 2004/0194462 A1 * | 10/2004 | Sunohara | B60T 11/16 60/533 |
| 2005/0001476 A1 * | 1/2005 | Kusano | B60T 17/04 303/113.4 |
| 2005/0044852 A1 * | 3/2005 | Tsubouchi | B60T 11/236 60/562 |
| 2005/0104443 A1 * | 5/2005 | Kusano | B60T 8/38 303/3 |
| 2006/0179836 A1 * | 8/2006 | Ishikawa | B60T 11/236 60/533 |
| 2007/0278855 A1 * | 12/2007 | Hatano | B60T 8/4081 303/116.1 |
| 2008/0079309 A1 * | 4/2008 | Hatano | B60T 8/4081 303/113.5 |
| 2009/0090105 A1 * | 4/2009 | Taira | B60T 11/232 60/585 |
| 2009/0126362 A1 * | 5/2009 | Nen | B60T 11/232 92/172 |
| 2009/0179483 A1 * | 7/2009 | Hatano | B60T 7/042 303/3 |
| 2009/0199555 A1 * | 8/2009 | Hatano | B60T 13/686 60/545 |
| 2009/0212621 A1 * | 8/2009 | Drott | B60T 8/38 303/14 |
| 2010/0001577 A1 | 1/2010 | Hatano | |
| 2012/0248860 A1 * | 10/2012 | Miyata | B60T 8/441 60/579 |
| 2013/0175851 A1 * | 7/2013 | Honda | B60T 13/146 303/6.01 |
| 2014/0054955 A1 * | 2/2014 | Ninoyu | B60T 8/4872 303/3 |
| 2014/0150645 A1 * | 6/2014 | Lhuillier | F16J 1/01 92/248 |
| 2014/0159473 A1 * | 6/2014 | Kuhlman | B60T 13/745 303/14 |
| 2014/0165553 A1 * | 6/2014 | Rodriguez | B60T 11/232 60/533 |
| 2014/0182283 A1 * | 7/2014 | Ohnishi | B60T 13/146 60/574 |
| 2014/0251125 A1 * | 9/2014 | Fritschle | B60T 11/232 92/169.1 |
| 2015/0007559 A1 * | 1/2015 | Oosawa | B60T 13/166 60/585 |
| 2015/0021977 A1 * | 1/2015 | Miwa | B60T 8/17 303/15 |
| 2015/0061363 A1 * | 3/2015 | Murayama | B60T 8/38 303/14 |
| 2015/0166029 A1 * | 6/2015 | Yamasaki | B60T 7/042 303/14 |
| 2016/0280191 A1 * | 9/2016 | Okano | B60T 8/17 |
| 2018/0022332 A1 * | 1/2018 | Sonoda | B60T 13/146 303/15 |
| 2018/0056957 A1 * | 3/2018 | Foerch | B60T 13/143 |
| 2019/0291704 A1 | 9/2019 | Anderson et al. | |
| 2020/0023828 A1 * | 1/2020 | Fukayama | B60T 13/148 |
| 2021/0024050 A1 * | 1/2021 | Ozeki | B60T 8/44 |
| 2021/0221345 A1 * | 7/2021 | Maruo | B60T 7/042 |

* cited by examiner

BRAKE DEVICE

CROSS-REFERENCE TO RELATED APPLICATION

The present application claims priority from Japanese Patent Application No. 2021-053130 filed on Mar. 26, 2021, the entire contents of which are hereby incorporated by reference.

BACKGROUND

The disclosure relates to the technical field of a brake device provided in a vehicle.

As described in Japanese Unexamined Patent Application Publication No. 2010-13069, a brake device generates a brake fluid pressure in a master cylinder in accordance with an operation of a brake pedal. The brake device operates a wheel cylinder with the brake fluid pressure generated in the master cylinder to brake the vehicle.

SUMMARY

An aspect of the disclosure provides a brake device to be applied to a vehicle. The brake device includes a housing, a piston, and a seal member. The housing has a first closed one end that is closed. The housing includes a supply port configured to communicate with a reservoir tank. The piston has an outer peripheral surface, an inner peripheral surface and a through-hole extending from the outer peripheral surface to the inner peripheral surface of the piston. The piston is configured to generate a hydraulic pressure in a hydraulic chamber in the housing by moving toward a side of the one first end inside the housing. The seal member is provided around the piston in a circumferential direction on the side of the first end with respect to the through-hole. The seal member is configured to seal between an inner peripheral surface of the housing and the outer peripheral surface of the piston.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the above-described brake device, an opening/closing valve and a slave cylinder are provided between the master cylinder and the wheel cylinder, and a negative pressure is generated in the wheel cylinder by operating the slave cylinder after the opening/closing valve is closed. Accordingly, the above-described brake device prevents the braking force from being continued by the wheel cylinder.

However, in the above-described brake device, the opening/closing valve and the slave cylinder are used, and the configuration may be complicated.

It is desirable to suppress dragging of a brake unit with a simple configuration.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
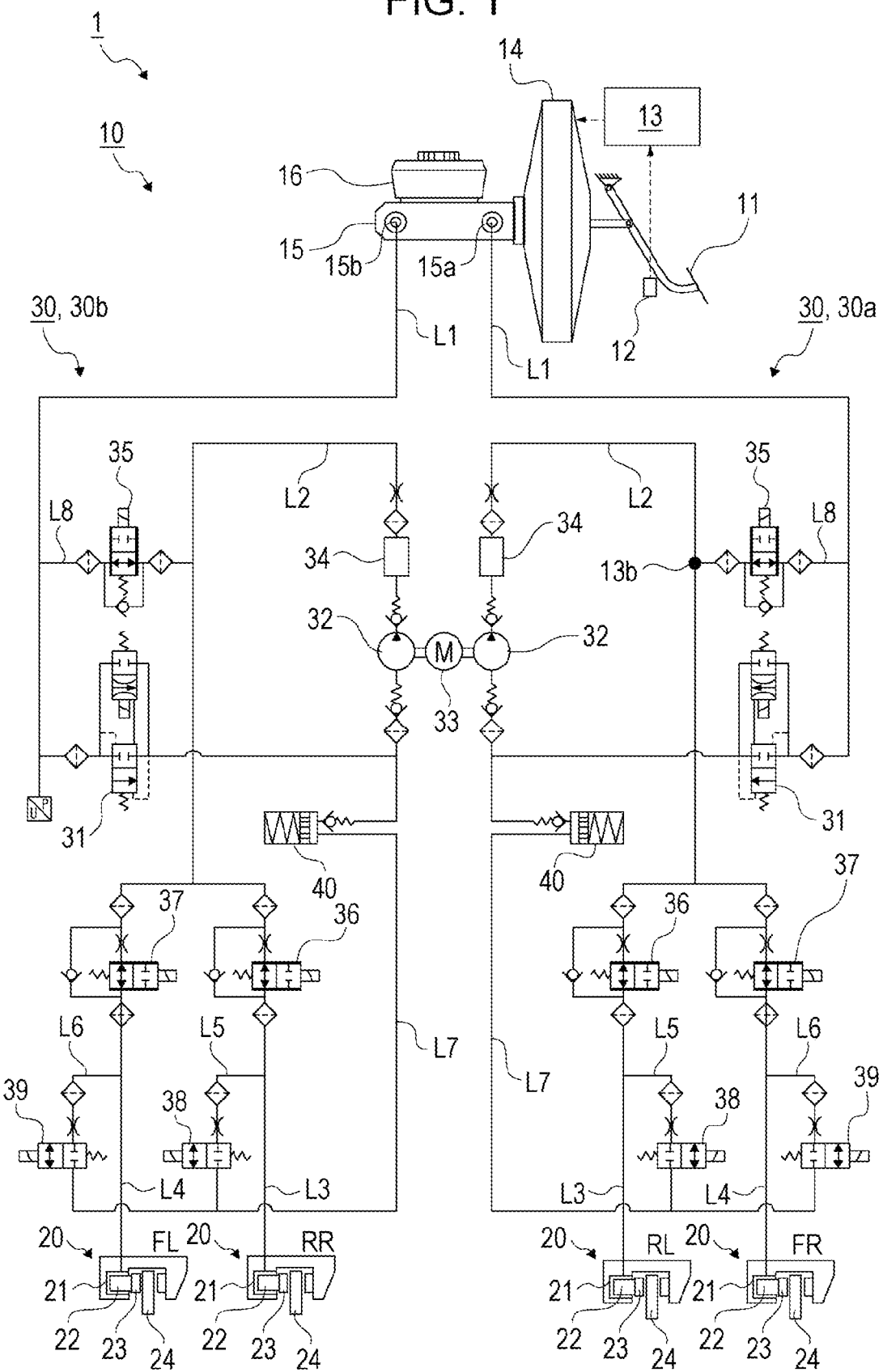
FIG. 1 is a diagram illustrating a configuration of a brake device.

FIG. 1 is a diagram illustrating a configuration of a brake device 10. As illustrated in FIG. 1, a vehicle 1 includes the brake device 10.

The brake device 10 includes a brake pedal 11 and a brake sensor 12. The brake pedal 11 is coupled to a brake booster 14. The brake sensor 12 detects a depression amount (stroke) of the brake pedal 11 and outputs information indicating the detected depression amount to a control device 13.

The control device 13 is a processor that includes a central processing unit (CPU), a read only memory (ROM), and a random access memory (RAM). The control device 13 controls the entire brake device 10 by loading a program stored in the ROM or a memory (not illustrated) into the RAM and executing the program.

The brake booster (booster device) 14 is, for example, an electric brake booster, and moves a primary piston 43 (see FIG. 2) of a master cylinder 15 under the control of the control device 13. For example, the brake booster 14 moves the primary piston 43 by a movement amount corresponding to the depression amount of the brake pedal 11.

The master cylinder 15 is a tandem master cylinder and is coupled to a reservoir tank 16 and to a brake unit 20 via a hydraulic circuit 30. As will be described later in detail, the master cylinder 15 generates a brake fluid pressure and applies the brake fluid pressure to the brake unit 20 via the hydraulic circuit 30.

The brake unit 20 is, for example, a disc brake unit, and is provided on each of wheels RL, FR, FL, and RR. The brake unit 20 includes a brake caliper 21, a brake piston 22, a brake pad 23, and a brake rotor 24. The brake fluid pressure is applied to the brake caliper 21 via the hydraulic circuit 30. The brake piston 22 is slidably accommodated in the brake caliper 21, and moves (slides) in the brake caliper 21 with the brake fluid pressure applied to the brake caliper 21.

The brake pad 23 is coupled to a distal end of the brake piston 22, and is pressed against the brake rotor 24 that rotates together with the wheel as the brake piston 22 moves with the brake fluid pressure. Accordingly, the brake unit 20 brakes the vehicle 1 (wheel).

The hydraulic circuit 30 is constituted by two systems of a first hydraulic circuit 30a and a second hydraulic circuit 30b. The hydraulic circuit 30 includes cross pipes or front and rear pipes. The first hydraulic circuit 30a is coupled to the brake units 20 provided on the wheels RL and FR, and the second hydraulic circuit 30b is coupled to the brake units 20 provided on the wheels FL and RR.

Since the first hydraulic circuit 30a and the second hydraulic circuit 30b have the same configuration, the same reference numerals are given below to simplify the description. In the hydraulic circuit 30, a master-cylinder-15 side is referred to as an upstream side, and a brake-unit-20 side is referred to as a downstream side.

The master cylinder 15 is provided with a supply/discharge port 15a and a supply/discharge port 15b. Respective first channels L1 are coupled to the supply/discharge port 15a and the supply/discharge port 15b. An upstream end of each first channel L1 is coupled to the master cylinder 15, and a downstream end thereof is coupled to a second channel L2.

A downstream end of the second channel L2 is branched into and coupled to a third channel L3 and a fourth channel L4. A downstream end of the third channel L3 is coupled to the brake unit 20 (brake caliper 21) of the wheel RL or the wheel RR. A downstream end of the fourth channel L4 is coupled to the brake unit 20 (brake caliper 21) of the wheel FL or the wheel FR. The third channel L3 and the fourth channel L4 each may be coupled to the brake unit 20 of any wheel. For example, the third channel L3 of the first hydraulic circuit 30a may be coupled to the brake unit 20 of the wheel RL, the fourth channel L4 thereof may be coupled to the brake unit 20 of the wheel RR, the third channel L3 of the second hydraulic circuit 30b may be coupled to the brake unit 20 of the wheel FR, and the fourth channel L4 thereof may be coupled to the brake unit 20 of the wheel FL. Alternatively, the third channel L3 of the first hydraulic circuit 30a may be coupled to the brake unit 20 of the wheel RR, the fourth channel L4 thereof may be coupled to the brake unit 20 of the wheel FR, the third channel L3 of the second hydraulic circuit 30b may be coupled to the brake unit 20 of the wheel RL, and the fourth channel L4 thereof may be coupled to the brake unit 20 of the wheel FL.

An upstream end of a fifth channel L5 is coupled to the middle of the third channel L3. An upstream end of a sixth channel L6 is coupled to the middle of the fourth channel L4. A seventh channel L7 is coupled to downstream ends of the fifth channel L5 and the sixth channel L6. A downstream end of the seventh channel L7 is coupled to a downstream side with respect to a gate-in valve 31 in the first channel L1 and an upstream side with respect to a hydraulic pump 32 in the second channel L2.

The gate-in valve 31 is provided in the first channel L1. The hydraulic pump 32 is provided in the second channel L2. Further, the hydraulic pumps 32 of the first hydraulic circuit 30a and the second hydraulic circuit 30b are coupled to a common electric motor 33.

A pulsation pressure-reducing mechanism 34 is provided downstream of the hydraulic pump 32 in the second channel L2. The pulsation pressure-reducing mechanism 34 attenuates the pulsation of the brake fluid discharged from the hydraulic pump 32.

An upstream side of the gate-in valve 31 in the first channel L1 and a downstream side of the pulsation pressure-reducing mechanism 34 in the second channel L2 are bypass-coupled via an eighth channel L8. A bypass valve 35 is provided in the eighth channel L8.

A pressurizing valve 36 is provided in the third channel L3. A pressurizing valve 37 is provided in the fourth channel L4. A depressurizing valve 38 is provided in the fifth channel L5. A depressurizing valve 39 is provided in the sixth channel L6.

A low-pressure chamber 40 is provided in the seventh channel L7. The low-pressure chamber 40 temporarily stores the brake fluid.

The gate-in valve 31, the depressurizing valve 38, and the depressurizing valve 39 are electromagnetic solenoid valves that are closed when not energized (during non-control) and opened when energized (during control). The bypass valve 35, the pressurizing valve 36, and the pressurizing valve 37 are electromagnetic solenoid valves that are opened when not energized (during non-control) and closed when energized (during control).

The gate-in valve 31, the electric motor 33, the bypass valve 35, the pressurizing valve 36, the pressurizing valve 37, the depressurizing valve 38, and the depressurizing valve 39 are controlled by the control device 13.

During non-control without control by the control device 13, as described above, the gate-in valve 31, the depressurizing valve 38, and the depressurizing valve 39 are closed, and the bypass valve 35, the pressurizing valve 36, and the pressurizing valve 37 are open. The electric motor 33 is not driven, and the hydraulic pump 32 is also stopped.

Thus, when a driver depresses the brake pedal 11 during non-control, the brake fluid pressure generated in the master cylinder 15 is branched into the third channel L3 and the fourth channel L4 via the first channel L1, the eighth channel L8, and the second channel L2, and is supplied to the brake units 20. Then, the brake units 20 brake the wheels with this brake fluid pressure.

The control device 13 performs hydraulic control such as antilock braking system (ABS) control operation or electronic stability program (ESP) control operation. During such control, the control device 13 opens the gate-in valve 31, the depressurizing valve 38, and the depressurizing valve 39, and closes the bypass valve 35, the pressurizing valve 36, and the pressurizing valve 37. Further, the control device 13 drives the electric motor 33.

Then, the hydraulic pump 32 is rotated by driving of the electric motor 33, and the brake fluid stored in the reservoir tank 16 is sucked into the first channel L1 via the master cylinder 15 independently of the operation of the brake pedal 11.

The brake fluid sucked into the first channel L1 passes through the second channel L2 via the gate-in valve 31, is branched into the third channel L3 and the fourth channel L4, and is supplied to the brake units 20. Then, the brake units 20 brake the wheels with this brake fluid pressure. When a specific wheel is to be braked, a corresponding one of the pressurizing valves 36 and 37 may be opened.

Figure 2:
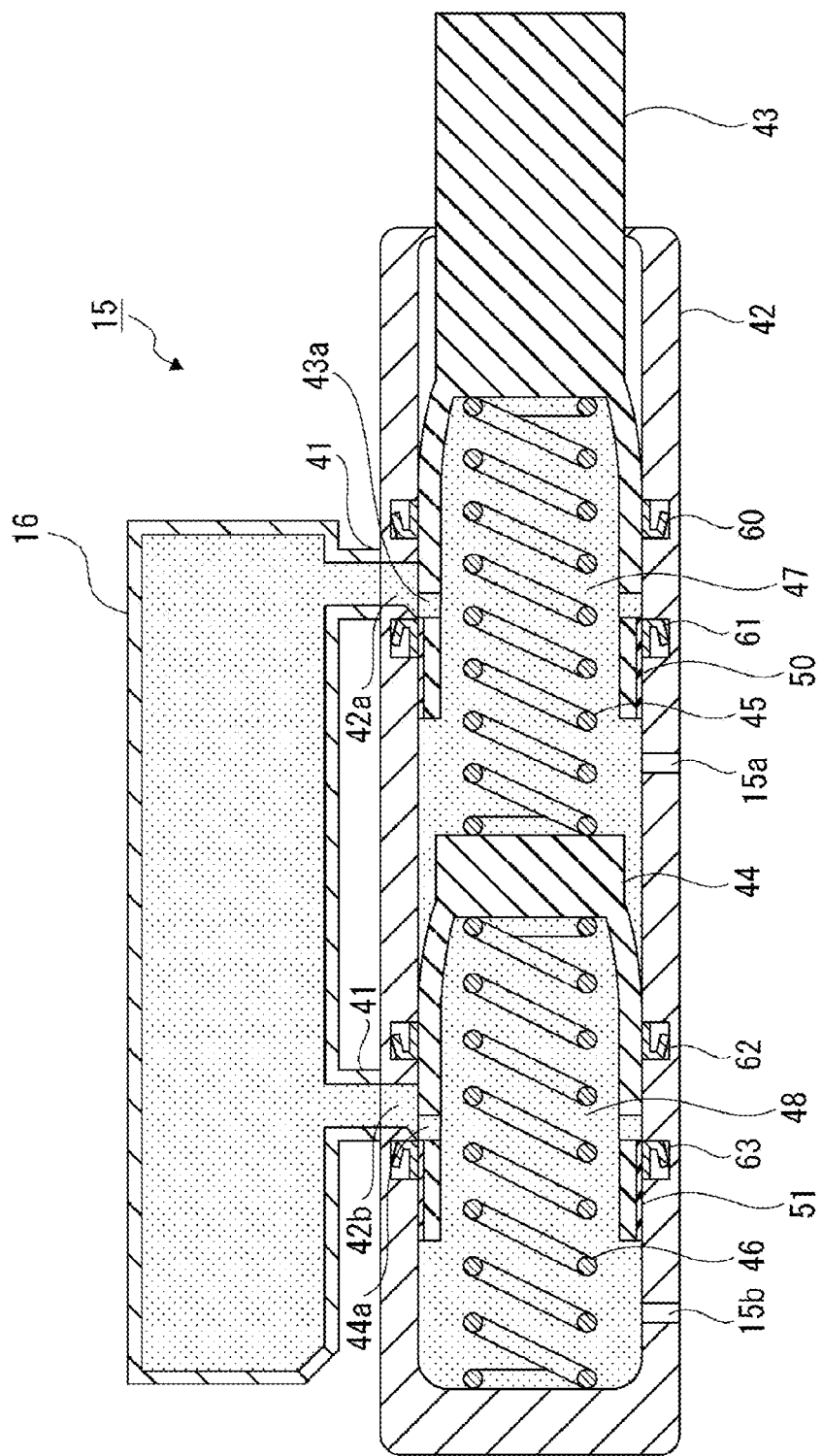
FIG. 2 is a view illustrating a configuration of a master cylinder.

FIG. 2 is a view illustrating a configuration of the master cylinder 15. As illustrated in FIG. 2, the reservoir tank 16 stores the brake fluid at atmospheric pressure and is provided with two supply channels 41.

The master cylinder 15 includes a housing 42, the primary piston 43, a secondary piston 44, a coil spring 45, and a coil spring 46.

The housing 42 has a cylindrical shape with one end (left end in the drawing) closed and the other end (right end in the drawing) open. The primary piston 43, the coil spring 45, the secondary piston 44, and the coil spring 46 are accommodated inside the housing 42 in this order from the other end side.

Supply ports 42a and 42b and the supply/discharge ports 15a and 15b are formed in the housing 42.

The supply ports 42a and 42b are coupled to the supply channels 41 of the reservoir tank 16.

The supply/discharge ports 15a and 15b are coupled to the respective first channels L1 of the first hydraulic circuit 30a and the second hydraulic circuit 30b (see FIG. 1).

In the master cylinder 15, a space surrounded by an inner peripheral surface of the housing 42, the primary piston 43, and the secondary piston 44 is formed as a primary chamber 47. Further, in the master cylinder 15, a space surrounded by the inner peripheral surface on one end side of the housing 42 and the secondary piston 44 is formed as a secondary chamber 48. The primary chamber 47 and the secondary chamber 48 may be collectively referred to as a hydraulic chamber.

The coil spring 45 is interposed between the primary piston 43 and the secondary piston 44. The coil spring 46 is interposed between one end of the housing 42 and the secondary piston 44.

The primary piston 43 is disposed on the other end side in the housing 42, and is moved toward the one end side (distal end side) and the other end side (proximal end side) by the brake booster 14 under the control of the control device 13. A situation in which the primary piston 43 is moved toward the one end side may be referred to as that the primary piston 43 is pushed. Further, a situation in which the primary piston 43 is moved toward the other end side may be referred to as that the primary piston 43 is pulled.

The primary piston 43 is formed such that the inside on a secondary-piston-44 side is recessed, and has a through-hole 43a extending through an outer peripheral surface and an inner peripheral surface of the primary piston 43. When the primary piston 43 moves to a position at which the through-hole 43a faces the supply port 42a, the primary chamber 47 and the reservoir tank 16 communicate with each other.

Further, the primary piston 43 is provided with a seal member 50 around the primary piston 43 in the circumferential direction on the one end side with respect to the through-hole 43a. The seal member 50 is made of an elastic material such as rubber, and is fixed to the outer peripheral surface of the primary piston 43.

When the primary piston 43 is pulled and moves to a position at which the seal member 50 faces the supply port 42a, the seal member 50 closes the supply port 42a. Accordingly, the primary chamber 47 and the reservoir tank 16 are disconnected from each other.

The secondary piston 44 is disposed in the housing 42 so as to be sandwiched between the coil spring 45 and the coil spring 46, and is moved to the one end side (distal end side) and the other end side (proximal end side) in accordance with movement of the primary piston 43. A situation in which the secondary piston 44 is moved toward the one end side may be referred to as that the secondary piston 44 is pushed. Further, a situation in which the secondary piston 44 is moved toward the other end side may be referred to as that the secondary piston 44 is pulled.

The secondary piston 44 is formed such that the inside on the one end side is recessed, and has a through-hole 44a extending through an outer peripheral surface and an inner peripheral surface of the secondary piston 44. When the secondary piston 44 moves to a position at which the through-hole 44a faces the supply port 42b, the secondary chamber 48 and the reservoir tank 16 communicate with each other.

Further, the secondary piston 44 is provided with a seal member 51 around the secondary piston 44 in the circumferential direction on the one end side with respect to the through-hole 44a. The seal member 51 is made of an elastic body such as rubber, and is fixed to the outer peripheral surface of the secondary piston 44.

When the secondary piston 44 is pulled and moves to a position at which the seal member 51 faces the supply port 42b, the seal member 51 closes the supply port 42b. Accordingly, the primary chamber 47 and the reservoir tank 16 are disconnected from each other.

Annular piston seals 60, 61, 62, and 63 that abut against the primary piston 43 and the secondary piston 44 are disposed in the inner peripheral surface of the housing 42 at predetermined intervals in the movement direction of the primary piston 43 and the secondary piston 44.

The piston seals 60 and 61 are disposed so as to sandwich the supply port 42a. The piston seals 62 and 63 are disposed so as to sandwich the supply port 42b.

In the master cylinder 15 configured as described above, the primary piston 43 and the secondary piston 44 are moved under the control of the control device 13. Hereinafter, a non-braking state in which the brake pedal 11 is not depressed and the brake fluid pressure is not applied to the brake unit 20 will be described.

In the master cylinder 15, the primary piston 43 and the secondary piston 44 are moved to either one of a first origin position and a third origin position under the control of the control device 13 during non-braking in which the brake fluid pressure is not applied to the brake unit 20. Since the primary piston 43 and the secondary piston 44 are moved to the same origin position during non-braking, the primary piston 43 will be described here, and a description of the secondary piston 44 will be omitted.

During non-braking, the control device 13 normally moves the primary piston 43 to the first origin position. Further, the control device 13 moves the primary piston 43 to the third origin position when the driver does not operate the brake pedal 11 so much during non-braking, for example, during high-speed traveling at a speed of 80 km/h or higher or during adaptive cruise control (ACC).

The first origin position is a position at which the through-hole 43a of the primary piston 43 and the supply port 42a face each other and the reservoir tank 16 and the primary chamber 47 communicate with each other.

When the primary piston 43 is located at the first origin position, the primary chamber 47 communicates with the reservoir tank 16 via the through-hole 43a.

Since the reservoir tank 16 stores the brake fluid at atmospheric pressure, the pressure in the primary chamber 47 communicating with the reservoir tank 16 also becomes atmospheric pressure, and the pressures in the hydraulic circuit 30 and the brake unit 20 coupled to the primary chamber 47 also become atmospheric pressure. Thus, the pressure in the brake caliper 21 of the brake unit 20 also becomes atmospheric pressure, and the brake pad 23 is no longer pressed against the brake rotor 24.

When the brake pedal 11 is operated and the primary piston 43 is pushed from the first origin position, the through-hole 43a deviates from the position facing the supply port 42a, and the primary chamber 47 is disconnected from the reservoir tank 16. When the primary piston 43 is further pushed, a brake fluid pressure (positive pressure) is generated in the primary chamber 47.

As described above, when the brake fluid pressure is generated in the primary chamber 47, the brake fluid pressure is applied to the brake unit 20 via the hydraulic circuit 30, and the brake unit 20 brakes the wheel.

Figure 3:
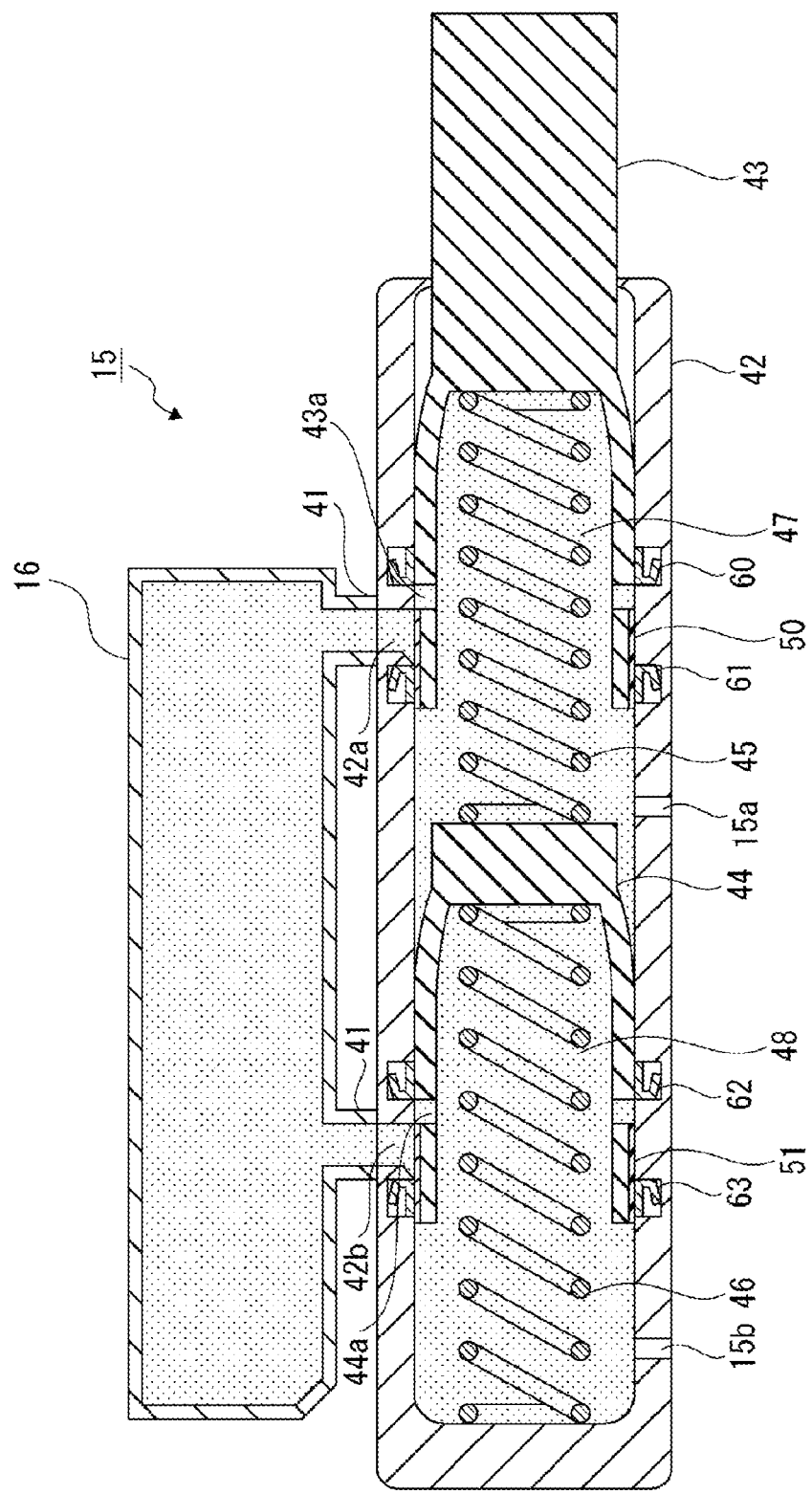
FIG. 3 is a view illustrating a second origin position.

FIG. 3 is a view illustrating a second origin position. The second origin position is a position on the other end side with respect to the first origin position and at which the supply port 42*a* and the seal member 50 face each other (a position immediately after facing each other). When the primary piston 43 is further pulled from the first origin position and moves to the second origin position, the supply port 42*a* and the seal member 50 face each other, the seal member 50 closes the supply port 42*a*, and the primary chamber 47 and the reservoir tank 16 are disconnected from each other.

As described above, in the brake device 10, the reservoir tank 16 and the primary chamber 47 are disconnected from each other by moving the primary piston 43 from the first origin position to the second origin position. While the primary piston 43 is moving from the first origin position to the second origin position, the reservoir tank 16 and the primary chamber 47 communicate with each other. Hence, the pressures in the hydraulic circuit 30 and the brake unit 20 are maintained at atmospheric pressure.

Figure 4:
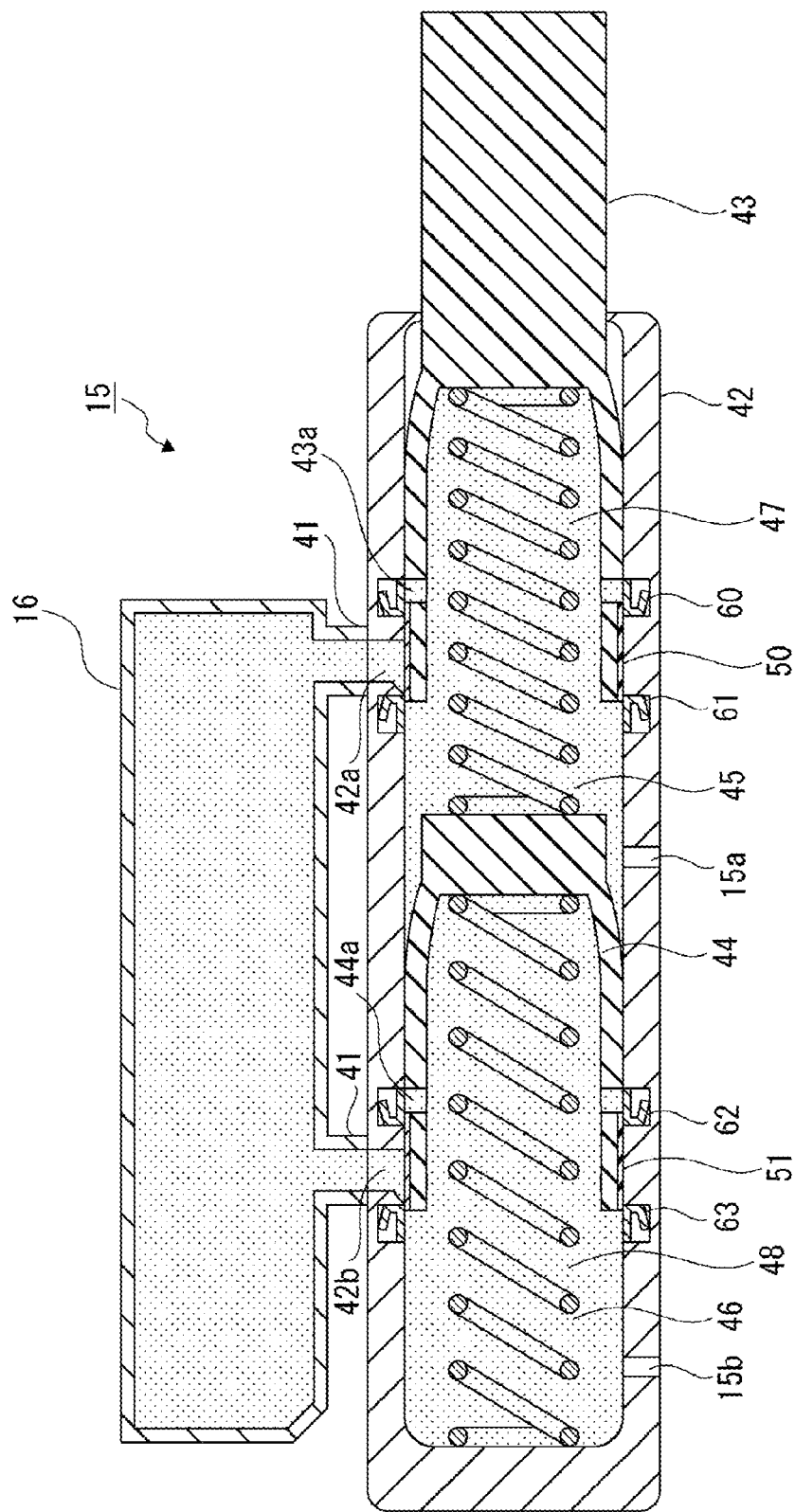
FIG. 4 is a view illustrating a third origin position.
Figure 5:
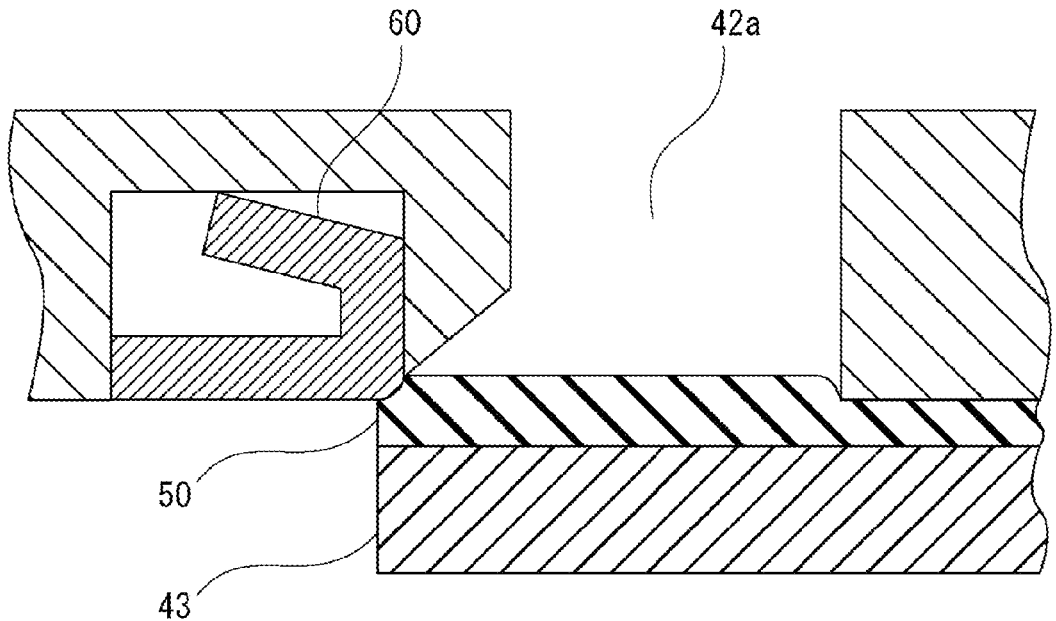
FIG. 5 is a view illustrating a relationship between a seal member and a supply port when a primary piston has moved to the third origin position.

FIG. 4 is a view illustrating the third origin position. FIG. 5 is a view illustrating a relationship between the seal member 50 and the supply port 42*a* when the primary piston 43 has moved to the third origin position.

As illustrated in FIGS. 4 and 5, the third origin position is a position at which the primary piston 43 is further pulled from the second origin position. In one example, the third origin position is a position at which an end on the one end side of the seal member 50 comes into close contact with an edge of the supply port 42*a*.

The brake device 10 can bring the pressure in the primary chamber 47 to a negative pressure by moving the primary piston 43 from the second origin position to the third origin position. Further, the brake device 10 can also bring the pressures in the hydraulic circuit 30 and the brake unit 20 to a negative pressure along with the negative pressure of the primary chamber 47. Accordingly, in the brake unit 20, the brake piston 22 is pulled with the negative pressure, and the brake pad 23 is moved away from the brake rotor 24.

Thus, the brake device 10 can suppress dragging of the brake pad 23 while being in contact with the brake rotor 24 by moving the primary piston 43 from the second origin position to the third origin position.

Figure 6:
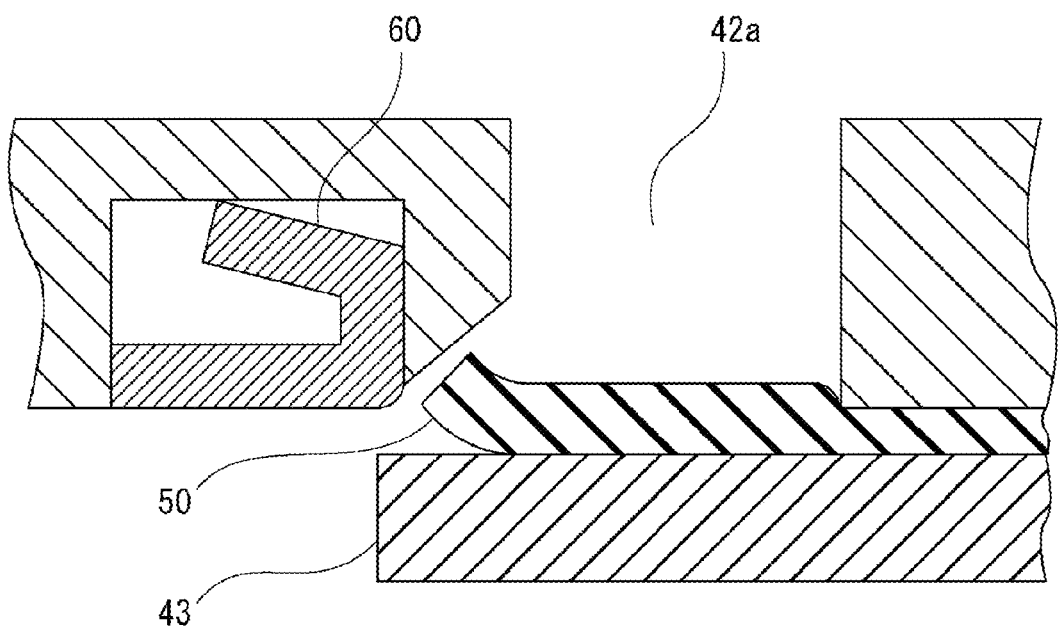
FIG. 6 is a view illustrating the seal member in a case where a positive pressure is generated at the third origin position.

FIG. 6 is a view illustrating the seal member 50 in a case where a positive pressure is generated at the third origin position. In the brake device 10, as described above, when the hydraulic control such as the ABS control operation or the ESP control operation is performed, the brake fluid pressure is applied to the brake unit 20 independently of the operation of the brake pedal 11, that is, independently of the operation of the master cylinder 15.

In a case where such hydraulic control is performed, even if the primary piston 43 is moved to the third origin position due to some cause such as a malfunction, when the brake fluid pressure in the hydraulic circuit 30 is maintained at a positive pressure, the brake fluid pressure (positive pressure) is applied to the brake unit 20. In such a situation, the brake pad 23 is dragged while being in contact with the brake rotor 24. That is, the state in which the braking force is applied to the wheel is maintained.

In the brake device 10, when a positive pressure is applied to the primary chamber 47 due to the positive pressure of the hydraulic circuit 30, as illustrated in FIG. 6, the seal member 50 that is an elastic body is deformed with the positive pressure, and the supply port 42*a* and the primary chamber 47 communicate with each other.

Accordingly, an irregular positive pressure applied to the primary chamber 47, the hydraulic circuit 30, and the brake unit 20 can be reduced in the brake device 10. Thus, the brake device 10 can suppress dragging of the brake pad 23 while being in contact with the brake rotor 24, and can suppress the state in which the braking force is applied to the wheel from being maintained.

A brake device 10 according to the above-described embodiment includes a housing 42 having closed one end and including a supply port 42*a*, 42*b* configured to communicate with a reservoir tank 16; a piston (primary piston 43, secondary piston 44) having a through-hole 43*a*, 44*a* extending through an outer peripheral surface and an inner peripheral surface of the piston, and configured to generate a hydraulic pressure (brake fluid pressure) in a hydraulic chamber (primary chamber 47, secondary chamber 48) in the housing 42 by moving toward one end side inside the housing 42; and a seal member 50, 51 provided around the piston in a circumferential direction on the one end side with respect to the through-hole 43*a*, 44*a*, and configured to seal between an inner peripheral surface of the housing 42 and the outer peripheral surface of the piston.

Accordingly, since the piston is pulled, the supply port 42*a*, 42*b* is closed with the seal member 50, 51, and a negative pressure can be generated in the hydraulic chamber.

Thus, the brake device 10 can suppress dragging of the brake unit 20 with a simple configuration.

The piston is movable among positions including a first origin position at which the through-hole and the supply port face each other and the reservoir tank and the hydraulic chamber communicate with each other, a second origin position that is on the other end side with respect to the first origin position and at which the supply port and the seal member face each other, and a third origin position on the other end side with respect to the second origin position.

Since the piston moves among the first origin position, the second origin position, and the third origin position, a negative pressure can be generated in the hydraulic chamber.

Thus, the brake device 10 can suppress dragging of the brake unit 20 with a simple configuration.

The piston generates a negative pressure in the hydraulic chamber by moving from the second origin position to the third origin position.

Accordingly, the pressures in the hydraulic circuit 30 and the brake unit 20 can also be brought to a negative pressure.

Thus, the brake device 10 can suppress dragging of the brake pad 23 while being in contact with the brake rotor 24.

When the piston is at the third origin position, an end of the seal member on the one end side is in close contact with an edge of the supply port.

Accordingly, when a positive pressure is applied to the hydraulic chamber due to the positive pressure of the hydraulic circuit 30, the seal member 50 is deformed with the positive pressure, and the supply port 42*a* and the hydraulic chamber communicate with each other.

Thus, in the brake device 10, an irregular positive pressure applied to the hydraulic chamber, the hydraulic circuit 30, and the brake unit 20 can be reduced.

The brake device 10 includes a controller configured to control movement of the piston, and the controller moves the piston to either one of the first origin position and the third origin position in accordance with a traveling state of a vehicle.

Accordingly, dragging of the brake pad 23 by the brake rotor 24 when the brake pedal 11 is not operated so much is suppressed, and the responsiveness of the brake can be enhanced in a situation in which the brake pedal 11 is operated.

Although the embodiment of the disclosure has been described above, the disclosure is not limited to the above-described specific examples, and various configurations can be adopted.

For example, although the primary piston 43 and the secondary piston 44 are provided as pistons in the embodiment described above, one piston or a plurality of pistons may be provided.

In the above-described embodiment, the brake booster 14 is an electric brake booster and moves the primary piston 43 under the control of the control device 13. However, the brake booster 14 may be, for example, a negative-pressure brake booster. In this case, the primary piston 43 and the secondary piston 44 may be moved to, for example, the third origin position during non-braking.

The invention claimed is:

1. A brake device to be applied to a vehicle, the brake device comprising:
   a housing having a first end that is closed, the housing comprising a supply port configured to communicate with a reservoir tank;
   a piston having an outer peripheral surface, an inner peripheral surface and a through-hole extending from the outer peripheral surface to the inner peripheral surface, the piston being configured to generate a hydraulic pressure in a hydraulic chamber in the housing by moving toward a side of the first end inside the housing; and
   a seal member provided around the piston in a circumferential direction on the side of the first end with respect to the through-hole, the seal member being configured to seal between an inner peripheral surface of the housing and the outer peripheral surface of the piston,
   wherein the piston is movable among positions including:
      a first origin position at which the through-hole and the supply port face each other and the reservoir tank and the hydraulic chamber communicate with each other,
      a second origin position that is on a side of a second end of the housing with respect to the first origin position and is farther from the first end than the first origin position, and the supply port and the seal member face each other at the second origin position, and
      a third origin position on the side of the second end with respect to the second origin position and is farther from the first end than the second origin position.

2. The brake device according to claim 1, wherein the piston generates a negative pressure in the hydraulic chamber by moving from the second origin position to the third origin position.

3. The brake device according to claim 1, further comprising:
   a controller configured to control movement of the piston, wherein the controller moves the piston to either one of the first origin position and the third origin position in accordance with a traveling state of the vehicle.

4. The brake device according to claim 2, further comprising:
   a controller configured to control movement of the piston, wherein the controller moves the piston to either one of the first origin position and the third origin position in accordance with a traveling state of the vehicle.

5. The brake device according to claim 1, wherein an end of the seal member on the side of the first end gets closer to an edge of the supply port while the piston is moving from the first origin position to the third origin position.

6. A brake device to be applied to a vehicle, the brake device comprising:
   a housing having a first end that is closed, the housing comprising a supply port configured to communicate with a reservoir tank;
   a piston having an outer peripheral surface, an inner peripheral surface and a through-hole extending from the outer peripheral surface to the inner peripheral surface, the piston being configured to generate a hydraulic pressure in a hydraulic chamber in the housing by moving toward a side of the first end inside the housing; and
   a seal member provided around the piston in a circumferential direction on the side of the first end with respect to the through-hole, the seal member being configured to seal between an inner peripheral surface of the housing and the outer peripheral surface of the piston,
   wherein the piston is movable among positions including:
      a first origin position at which the through-hole and the supply port face each other and the reservoir tank and the hydraulic chamber communicate with each other,
      a second origin position that is on a side of a second end of the housing with respect to the first origin position and at which the supply port and the seal member face each other, and
      a third origin position on the side of the second end with respect to the second origin position,
   wherein, when the piston is at the third origin position, an end of the seal member on the side of the first end is in close contact with an edge of the supply port.

7. The brake device according to claim 4, further comprising:
   a controller configured to control movement of the piston, wherein the controller moves the piston to either one of the first origin position and the third origin position in accordance with a traveling state of the vehicle.

8. The brake device according to claim 6, wherein the end of the seal member on the side of the first end gets closer to the edge of the supply port while the piston is moving from the first origin position to the third origin position.

9. A brake device to be applied to a vehicle, the brake device comprising:
   a housing having a first end that is closed, the housing comprising a supply port configured to communicate with a reservoir tank;
   a piston having an outer peripheral surface, an inner peripheral surface and a through-hole extending from the outer peripheral surface to the inner peripheral surface, the piston being configured to generate a hydraulic pressure in a hydraulic chamber in the housing by moving toward a side of the first end inside the housing; and
   a seal member provided around the piston in a circumferential direction on the side of the first end with respect to the through-hole, the seal member being configured to seal between an inner peripheral surface of the housing and the outer peripheral surface of the piston,
   wherein the piston is movable among positions including:
      a first origin position at which the through-hole and the supply port face each other and the reservoir tank and the hydraulic chamber communicate with each other, a second origin position that is on a side of a second end of the housing with respect to the first origin position and at which the supply port and the seal member face each other, and a third origin position on the side of the second end with respect to the second origin position, wherein, the piston generates a negative pressure in the hydraulic chamber by moving from the second origin position to the third origin position, when the piston is at the third origin position, an end of the seal member on the side of the first end is in close contact with an edge of the supply port.

10. The brake device according to claim 9, further comprising:

a controller configured to control movement of the piston, wherein the controller moves the piston to either one of the first origin position and the third origin position in accordance with a traveling state of the vehicle.

11. The brake device according to claim 9, further comprising:

a controller configured to control movement of the piston, wherein the controller moves the piston to either one of the first origin position and the third origin position in accordance with a traveling state of the vehicle.

12. The brake device according to claim 9, wherein the end of the seal member on the side of the first end gets closer to the edge of the supply port while the piston is moving from the first origin position to the third origin position.

* * * * *